INVENTOR

ALFRED I. IANSONS

INVENTOR
ALFRED I. IANSONS
BY
ATTORNEYS

United States Patent Office 3,422,966
Patented Jan. 21, 1969

3,422,966
METHOD OF FEEDING BLANKS TO MACHINE TOOLS AND DEVICE FOR REALIZATION OF THIS METHOD
Alfred Ianovich Iansons, Lanku ulitsa 7, kv. 3, Riga, U.S.S.R.
Filed Oct. 18, 1965, Ser. No. 497,174
U.S. Cl. 214—1          3 Claims
Int. Cl. B65g 29/00, 47/22

ABSTRACT OF THE DISCLOSURE

The feeding of blanks primarily shaped as solids of revolution from starting positions to working positions in machine tools in which the blanks are fed by feeding elements describing cycloids and with the starting and working positions of the tools are removed and unloaded respectively, being located at the reversal points of the cycloids.

---

This invention relates to methods for feeding blanks from starting positions to working positions in machine tools, and more particularly to methods for feeding blanks shaped primarily, as solids of revolution in which the blanks are removed from the starting position, loaded into machine tools and unloaded therefrom by way of a shockless engagement with the feeding elements.

The present method may be used for the automation of the loading and unloading of machine tools such as lathes, automatic, presses, assembly equipment, rotary machines and transfer machines of both the in-line and rotary types.

It is known to use a method for feeding blanks to the working positions in machine tools in which the feed is effected by virtue of a reciprocating motion of the feeding elements. This method, however, fails to provide a shockless engagement between the blanks and the feeding elements when removing the blanks from the starting position as well as when loading the blanks into machine tools or unloading the blanks therefrom. Apart from foregoing, with this method no increase in machining efficiency can be obtained by reducing non-production time.

It is also known to use a method for feeding blanks to the working position in machine tools in which the feed is effected by virtue of a rotary motion of the feeding elements. This method is employed, for example, in feeding work-pieces from the starting positions of an unloading rotor to the working positions of a machining rotor. This method is also deficient in that it fails to provide a shockless feed due to the sharp non-uniformity in the variation of the rate of acceleration.

It is an object of the present invention to provide a method whereby blanks primarily shaped as solids of revolution can be fed from the starting position to the working position in machine tools and means for carrying this method into effect so that a smooth movement of blanks can be achieved.

Another object of this invention is to provide a method whereby blanks primarily shaped as solids of revolution can be fed from the starting positions to the working positions of machine tools and means for carrying this method into effect so as to enable the blanks to be removed from the starting positions, loaded into the working positions in machine tools and unloaded therefrom by way of a shockless engagement with the feeding elements.

According to the present invention, blanks primarily shaped as solids of revolution are fed from starting positions to working positions in a machine tool by means of at least one feeding element and along at least one closed trajectory, which is essentially a cycloid, and with the starting and working positions of the tool being located at the reversal points of the cycloid. The employment of a cycloidal movement enables work-pieces to be fed from the starting position, loaded into the working position and unloaded therefrom by way of a shockless engagement with the feeding elements.

With rotary machines in which the starting positions are fixed and located on one circle, while the working positions are movable and located on another circle concentric to the first circle, blanks primarily shaped as solids of revolution are fed from the starting positions to the working positions in a machine tool by means of at least one feeding element along closed trajectories which are essentially cycloids and whose reversal points aligned with the starting and working positions of the tool are located on two concentric circles and are moved along at least one of the circles at a preset speed.

To ensure shockless engagement of the blanks with the feeding element, their feeding to the starting positions, as well as loading to the working positions and unloading therefrom, in case the starting positions are located on one circle and the working positions on another circle concentric to the first circle, the circle described by the blank engaged with the feeding element as a result of the rotation thereof around its axis must touch the concentric circles and roll along such circles without sliding. This may be achieved provided one of the concentric circles is rotating and the blank engaged with the feeding element simultaneously describes two cycloids, one of which cycloids is described as a result of the blank displacement relative to the fixed circle and the other as a result of the blank displacement relative to the second rotating circle concentric to the first circle. In other words, the reversal point of the first cycloid with the starting positions located therein are fixed and the reversal points of the second cycloid having the working positions of the tool located therein, as well as the cycloid as a whole, rotate together with the movable circle.

According to the present invention, the means for feeding blanks from the starting positions to the working positions in machine tools is essentially an epicyclic gearing in which the planet pinions carry on their shafts feeding elements for blanks which displace the latter along cycloids when the planet carrier is rotating.

Further objects and advantages of the invention will become more fully apparent to persons skilled in the art from the following detailed description and annexed drawings and in which drawings.

Figure 1:
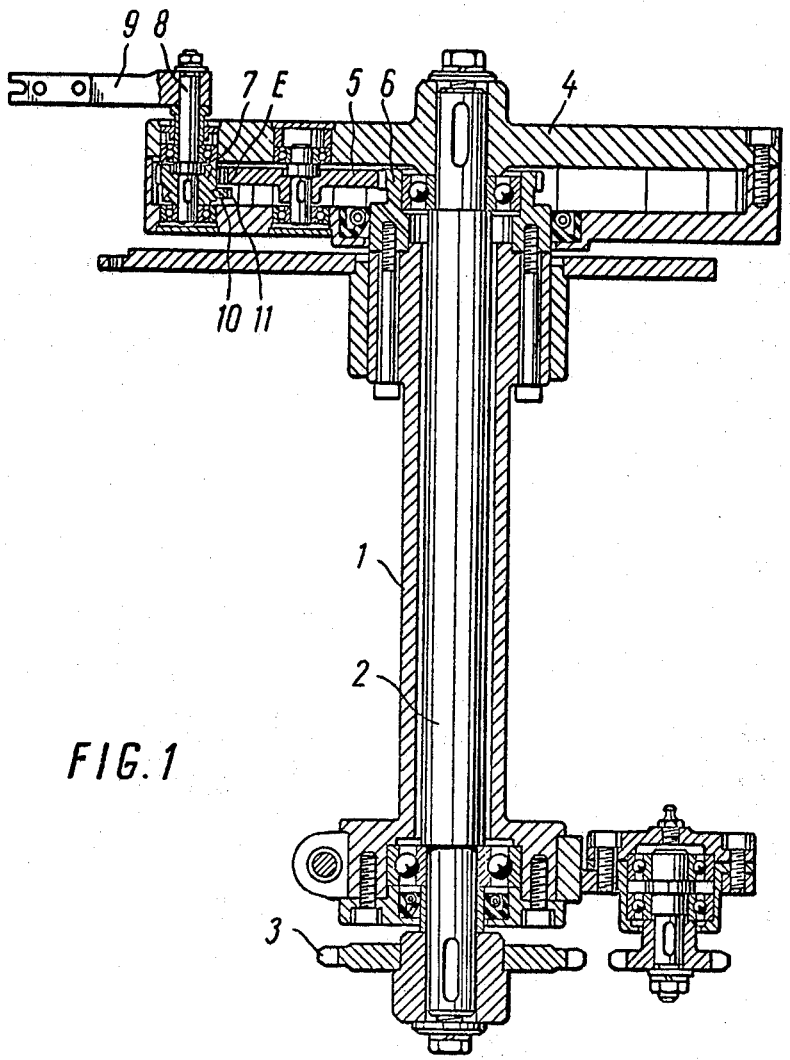
FIG. 1 is a view partly in elevation and partly in cross section illustrating a device for feeding blanks from the starting positions to the working positions of the tool in which the starting and working positions are located on one circle.
Figure 2:
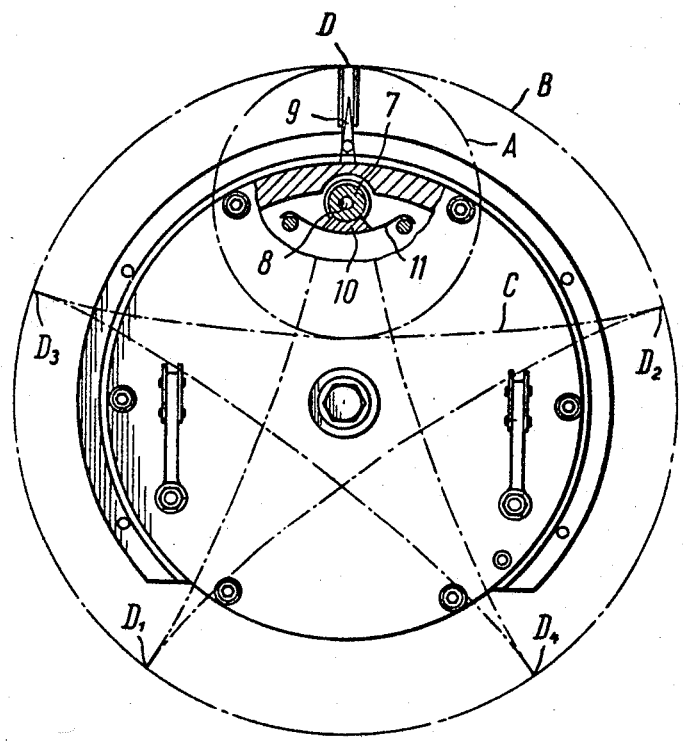
FIG. 2 is a plan view of the device shown in FIG. 1, partly broken away.

The device for executing the method is essentially a drive and an epicyclic gearing. As shown in FIGS. 1 and 2, the drive comprises a stationary sleeve 1, a drive shaft 2 freely rotatable in the sleeve 1 and a sprocket 3 fixedly secured to one end of the drive shaft 2 and through which rotary movement is imparted to the drive shaft.

The epicyclic gearing includes a sun gear 6 freely mounted on the drive shaft 2, a planet carrier 4 fixedly secured to the drive shaft 2, a shaft 8 freely rotatable in the carrier 4, a planet pinion rigidly fixed to the shaft 8 and kinematically connected to the sun gear 6 by means of an idler gear 5. A feeding element 9 is mounted on the shaft 8 of the planet pinion 7 and a brake shoe 10 is urged by a spring 11 against the shaft 8.

It is believed that FIG. 2 clearly illustrates the manner in which a blank is moved. The blank positioned in the feeding element 9 rotatable about the shaft 8 is evenly displaced along the circle A whereby the shaft 8 freely rotatable in the carrier 4 simultaneously with the rotation of the carrier 4 along a circle displaces in such a fashion that the circle A rolls at a constant speed and without slippage over the circle B. As a consequence, the blank is displaced by the feeding element 9 along the hypocycloid C provided with reversal points $D-D_4$ in which are located the starting and working positions of the machine tool. It will be noted that the reversal points $D-D_4$ of the hypocycloid C are located on the circle B.

With rotation of the drive shaft 2, as well as the carrier 4, the shafts 8 of the planet pinions 7 freely rotatable in the carrier 4 displace along a circle which, since the pinions 7 are fixedly secured on the shafts 8 and kinematically connected to the fixed sun gear 6 which is freely mounted on the drive shaft by means of the idler gear 5 and the feeding elements 9 being fixedly mounted on the shafts 8 displace the blanks held thereby along a closed trajectory which is essentially a hypocycloid C.

The dimensions of the device, the length of the feeding elements and the gear ratios are such that the circle A rolls without slipping over the circle B and due to which the end of the feeding element 9 describes the hypocycloid C. Since the ratio between the diameters of the circles A and B is 1 to 2.5, the hypocycloid C has five reversal points and the feeding element 9 passes through all five reversal points each two revolutions of the shaft 2.

The device shown in FIGS. 1 and 2 is intended for feeding the blanks for the starting position to the working position of an automatic lathe and is provided with three feeding elements 9. The blanks are removed at the point $D_1$ which is a reversal point of the hypocycloid C.

In the position $D_2$, which is the subsequent reversal point of the hypocycloid C, is situated an arrangement which locates the blank in the feeding element. At the point $D_3$, a check is made for the presence of the blank in the feeding element. At the point $D_4$ the blanks fed to the working position are counted. At the subsequent point D, which is the reversal point of the hypocycloid C, is located the working position proper, viz. the collet of the automatic lathe (not shown in FIGS. 1 and 2).

When the axis of the blank lines up with the axis of the collet, a pusher incorporated in the device (not shown in FIGS. 1 and 2) moves the blank into the collet in which it is clamped.

The planet pinion 7 (FIGS. 1 and 2) is provided with a groove E inside of which the brake 10 loaded by the spring 11 is slidably mounted. The provision of the brake offsets the influence of the gear back-lash on the movement of the feeding elements 9.

During the cycloidal movement of the feeding elements 9, their speed at the cycloid reversal points $D-D_4$ diminishes to zero, whereas the variation in speed and acceleration is smooth throughout the cycloidal movement. This enables the blanks to be removed, loaded and unloaded, by way of a shockless engagement with the feeding elements.

The use of the cycloidal motion associated with a continuous rotation of the planet carrier 4 affords a basic for the determination of the time taken for a feeding element 9 to occupy the starting or the working position. In the case concerned this is 25° of the rotation of the planet carrier 4. It can be practically assumed that at the moment of unloading the blank from the working position that the center of the blank is stationary (accurate to 0.1–0.15 mm.) through 5–10° of the rotation of the planet carrier 4. This period can be increased 1.5 times by using three feeding elements 9, inasmuch as under these conditions each feeding element passes through one working position every two revolutions of the shaft 2.

The use of the present device with a single-spindle automatic lathe for facing a sleeve with a shaped cutting tol has increased the machining output from 12 to 200 articles per minute owing to the reduction in the nonproduction time. Apart from this a considerable reduction is obtained in the amount of scrape resulting from the lack of precision in feeding the blanks into the working position, viz, into the collet of the lathe.

The device may be so built that the blanks engaged with the feeding elements move along a hypocycloid or an epicycloid.

The feeding element 9 may widely vary in construction. The possible embodiments include mechanical, controlled, uncontrolled, magnetic, electromagnetic, singleposition and multi-position feeding elements as well as feeding elements to handle blanks of a single type or several blanks of various types displaced with regard to the height and the radius of the circle A (FIG. 2).

Figure 3:
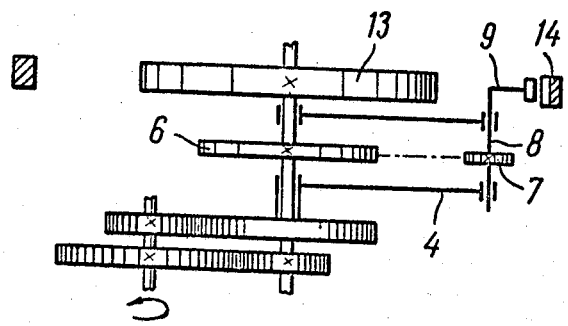
FIG. 3 is a kinematic diagram of the device for feeding blanks from the starting positions to the working positions of the tool in which the starting and working positions are located respectively on two concentric circles.
Figure 4:
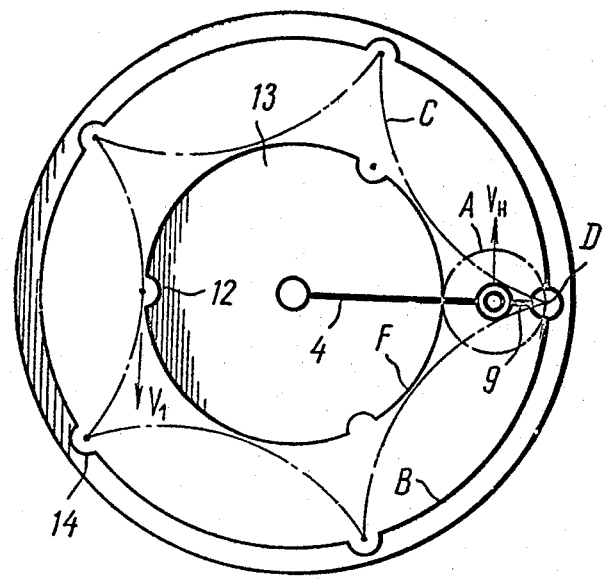
FIG. 4 is a plan view of the device shown in FIG. 3.

The present method can also be employed for feeding the blanks to the working positions of rotary machines in which the starting and working positions are situated on two concentric circles respectively, one of which is the circle F (FIGS. 3 and 4) passing through working positions 12 of a rotor 13, and the other the circle B passing through starting positions 14.

Several, for example five, starting positions 14 may be used for removing the blanks. The rotor 13 has three work positions 12. The feeding element 9 is attached to the shaft 8 of the planet pinion 7 which is moved by the planet carrier 4 so that the circle A rolls without slipping around the fixed circle B and along the movable circle F concentric to the circle B whereby the blank engaged with the feeding element 9 will displace with respect to the fixed circle B along a hypocycloid and with respect to the rotating circle F, along an epicycloid (not illustrated).

The speed $V_1$ of the rotor 13 rotation is accordingly twice as great as the speed $V_H$ of the planet carrier 4 rotation which is necessary to make the circle A roll along the circle F without sliding. The shockless loading (unloading) of blanks to the working positions 12 of the rotor 13 is carried out or effected at the reversal points of the epicycloid along which the blanks engaged with the feeding element 9 move relative to the rotating rotor 13.

Figure 5:
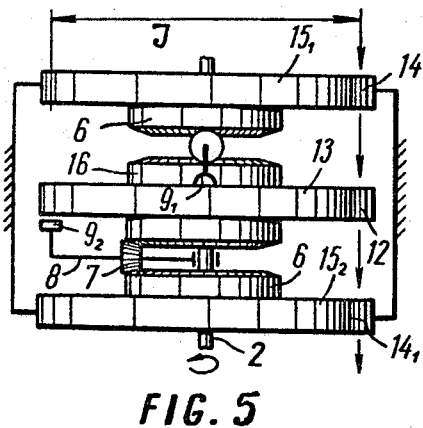
FIG. 5 is a diagrammatic view of a rotary machine provided with feeding elements having a cycloidal motion.

The use of the blanks feeding along cycloids permits the feed to be arranged in a rotary line wherein all the rotors are positioned on one shaft (FIG. 5). In this case, the starting positions 14 for feeding the blanks are situated on a stationary disc $15_1$, the working positions 12 on the rotor 13, and the starting positions $14_1$ for removing the blanks on a stationary disc $15_2$. The sun gears 6 of the feeding elements $9_1$ and $9_2$ are affixed to the discs $15_1$ and $15_2$ and gears 16 are rigidly connected to the rotor 13. Interposed between the sun gear 6 and the gear 16 is the planet pinion 7 and on shaft 8 of which are mounted the feeding elements $9_1$ and $9_2$.

The gear ratios are so arranged that when the shaft 2 of the rotor 13 rotates, the circle A described by the feeding elements $9_1$ and $9_2$ rolls without slipping around an appropriate circle with diameter J, at an angle of 90°. This providing the displacement of the blanks engaged with the feeding elements along a space cycloid. The blanks are removed and fed out from the stationary discs at the cycloid reversal points. The movement of the blanks engaged with the feeding element $9_1$ and $9_2$ relative to the rotor 13 is also cycloidal, with the loading and unloading of the working positions 12 of the rotor 13 being performed up the reversal points of the space cycloid.

The rotor 13 operates on the following principle:
The feeding element $9_1$ delivers the blanks from the starting position 14 on the stationary disc $15_1$ to the working position 12 of the rotor 13, and then are passed by the feeding element $9_2$ to the starting position $14_1$ of the stationary disc $15_2$.

By arbitrarily increasing the number of rotors and stationary discs, rotary machining lines can be created wherein all the rotors are positioned on one shaft 2. By disposing the working positions 12 on the stationary discs and the intermediate starting positions $14_1$ on a rotary disc, a multi-position machine can be arranged wherein the working positions 12 are stationary.

The present method can also be employed for feeding blanks which are not shaped as solids of revolution, such as for example link plates of motorcycle chains.

The resetting of the feeding device for handling various types of blanks is utterly simple, which enables the device to be used even for small-batch production.

In cases where the device has to meet the requirements of relatively large parameters, the gearing can be replaced by a chain drive.

It follows from the foregoing that the proposed method has a number of advantages over the methods known heretofore. The proposed method permits feeding blanks in a constant and definite path accurate to hundredths of a millimetre. The use of several starting and working positions (the number of which is not stipulated) makes it possible to perform a number of additional operations, for example to locate the blanks in the feeding devices, to feed out blanks in various flow lines in accordance with a preset program or to assemble an arbitrary number of similar or different components. The shockless removing and feeding-out of blanks permits a new approach to the question of limits of machining efficiency.

Ignoring the rotary movement of the blank around the center of the feeding element, the use of the proposed device permits of material reduction in non-production time and thus enables machining efficiency to be increased many times as compared with machine tools employing the devices heretofore known in the art.

The invention is not to be confined to any strict conformity to the showings in the drawings but changes or modifications may be made therein so long as such changes or modifications mark no material departure from the spirit and scope of the appended claims.

What is claimed is:

1. A method for feeding blanks primarily shaped as solids of revolution from the starting positions to the working positions of a machine tool, comprising feeding the blanks by means of at least one feeding element along at least one closed trajectory defined essentially as a cycloid and said starting and working positions being located at the reversal points of the cycloid.

2. The method for feeding blanks as claimed in claim 1 wherein the reversal points at which the starting and working positions of the machine tool are disposed on two concentric circles and move over at least one of such circles at a predetermined speed.

3. A device for feeding blanks primarily shaped as solids of revolution from the starting positions to the working positions of the machine tool, comprising a drive including a rotatable drive shaft, and an epicyclic gearing, said epicyclic gearing including a sun gear freely mounted on the drive shaft, a planet carrier rigidly connected to the drive shaft, shafts freely rotatable in said planet carrier, planet pinions rigidly secured on said shafts, means kinematically connecting the planet pinions to the sun gear, feeding elements rigidly secured on said shafts and movable with the rotation of said planet carrier and planet pinions for ensuring feeding of the blanks along at least one cycloid and the starting and working positions of the machine tool being located at the reversal points of the cycloid.

References Cited

UNITED STATES PATENTS

| | | | |
|---|---|---|---|
| 2,415,997 | 2/1947 | Eldred | 214—1 |
| 2,931,276 | 4/1960 | Zerlin | 214—1 |

GERALD M. FORLENZA, *Primary Examiner.*

G. F. ABRAHAM, *Assistant Examiner.*

U.S. Cl. X.R.

214—152